Aug. 6, 1940.  S. SPECKERT  2,210,605
TOOL HOLDER
Filed March 8, 1939
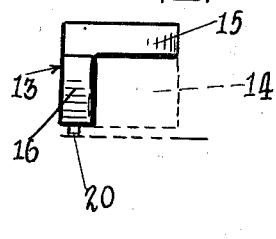
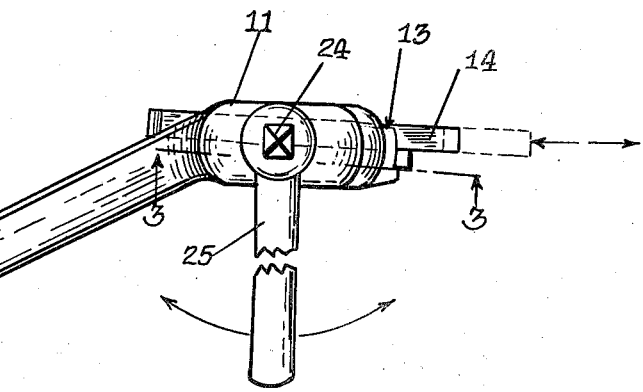
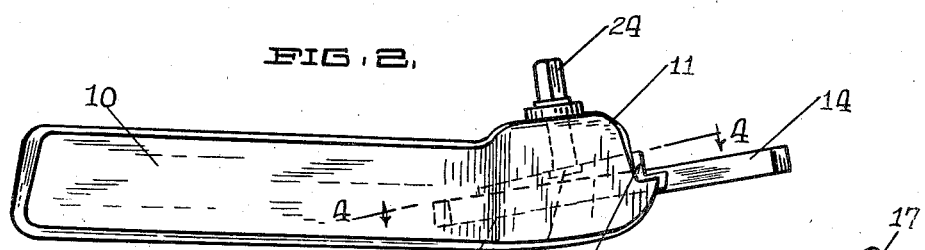
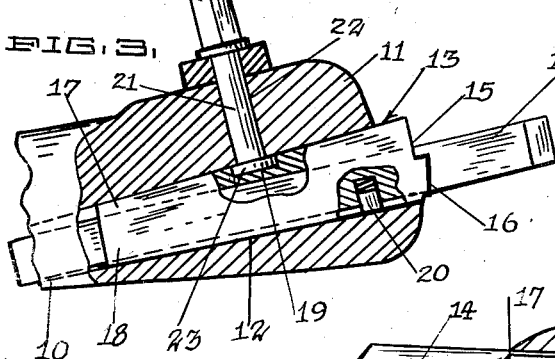
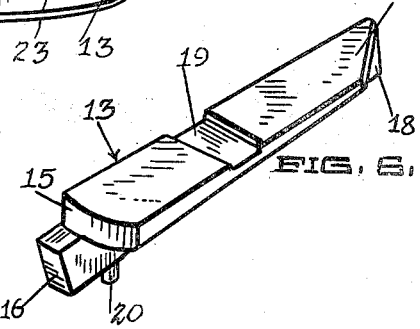
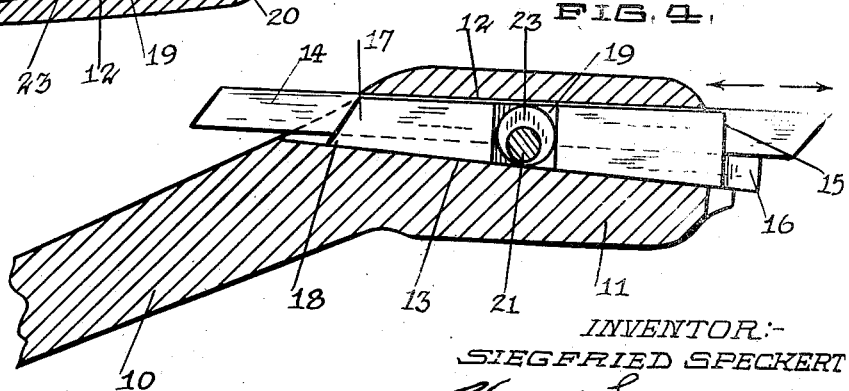
INVENTOR:-
SIEGFRIED SPECKERT
BY Victor J. Evans & Co
ATTORNEYS.

Patented Aug. 6, 1940

2,210,605

UNITED STATES PATENT OFFICE 2,210,605

TOOL HOLDER

Siegfried Speckert, South Gate, Calif.

Application March 8, 1939, Serial No. 260,637

7 Claims. (Cl. 29—100)

The present invention relates generally to improvements in tool holders and especially to a cutting tool holder for use in connection with lathes or like machines.

The principal object of the invention is to provide an improved cutting tool holder which employs a wedge element arranged through the head of the holder and with which is associated a simple and positive mechanism for actuating the wedge element to securely grip and hold the cutting tool in operative position within the holder.

Another object of the invention is to provide a tool holder of the class set forth that embodies a minimum number of working parts, is absolutely positive in its gripping action, and one in which the cutting tool may be easily and quickly adjusted to cutting position.

A further object of the invention is the provision of a tool holder of this type that employs a single piece wedge operable through the actuation of a simple eccentric mechanism normally engaging the wedge and capable of moving said wedge relative to the head of the holder and the cutting tool to cause either the release of the cutting tool or the gripping of the same relative to said holder head.

Other objects and advantages will be apparent during the course of the following description.

In the accompanying drawing forming a part of this specification and in which like numerals are employed to designate like parts throughout the same, Fig. 1 is a top plan view of the usual form of tool holder, showing the improved form of the present invention as applied thereto and also including an actuating wrench applied to the eccentric mechanism for the operation of the wedge;

Fig. 2 is a side elevation of the tool holder, the cutter, the wedge, and the eccentric mechanism for operating the same;

Fig. 3 is an enlarged sectional detailed view taken on the line 3—3 of Fig. 1 and illustrating the position of the wedge relative to the cutter, and also the eccentric means for actuating the wedge;

Fig. 4 is a plan section on an enlarged scale taken on the line 4—4 of Fig. 2 and further illustrating the relative positions of the wedge member, the eccentric operating means, and the cutting tool;

Fig. 5 is an end view of the wedge per se; and

Fig. 6 is a perspective view of the wedge member and further illustrating the general configuration of the same.

In my copending application, Serial No. 154,897, filed July 21, 1937, two wedging pins were employed to wedge the cutting tool in the head of the holder. However, in the present application a slidable wedge is employed and is operated by a simple eccentric mechanism contacting the wedge to tighten or release the cutting tool relative to the head, which considerably simplifies the device as to the number of parts and as to the operation of the device.

Referring more particularly to the drawing, in which the preferred form of the invention is disclosed, the holder comprises the usual shank 10 having a head 11 integrally formed therewith, through which head a tapered slot 12 is milled to receive the wedge member 13 and the cutting tool 14 which cutting tool is of the usual rectangular form of hardened steel having cutting faces formed on opposite ends thereof.

The wedge member 13, as clearly disclosed in Figs. 5 and 6, is of L-shaped configuration and tapers from its forward thick end sections 15 and 16 rearwardly to the ends 17 and 18 respectively, and is provided substantially midway of the transverse section thereof with a transverse slot 19, said wedge member also being provided with a spring urged pin or pins 20 capable of engaging the bottom face of the slot 12 so that when the wedge member is released, said pin or pins will tend to raise the wedge free from the cutting tool 14.

The eccentric mechanism for the operation of the wedge element comprises a pin 21 extending through a bore 22 formed in the head 11 of the holder and having an eccentric member 23 formed on its inner end and capable of engaging in the slot 19 formed in the wedge member 13, the outer end of said pin being provided with a wrench head 24 adapted to receive a wrench 25, as shown in Fig. 1, to actuate said eccentric member and in turn actuate the wedge member through the slot in the head 11.

It will now be observed that the cutting tool 14 fits within the L-shaped sections of the wedge member and when in assembled relation, as shown in Figs. 3 and 4, and mounted within the tapered slot 12 of the head, the upper portion 15 of the wedge and the vertical section thereof do not normally quite contact the inner surfaces of the slot 12. Therefore, the side, bottom and upper surfaces of the cutting tool 14 are normally free to be moved relative to the wedge member through said slot—that is, when the wedge member has been moved outwardly by the manipulation of the cam 23, as described. Therefore, it will be noted that when the eccentric member is actuated to clamp the adjusted cutting tool, said tool will be tightly wedged against all interior surfaces of the slot and the wedging member when said wedging member is moved rearwardly and held in fixed clamped position by means of the eccentric member 23.

It will also be observed that a tool clamped and wedged in cutting position in this manner cannot slip relative to the head of the holder for the reason that the more endwise pressure applied to the cutting tool, the more tightly wedged will be said tool in the head of the tool holder.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the class described, in combination with a tool holder having a slotted head, a wedge member slidable in said slotted head and generally conforming to the configuration of the slot, a cutting tool slidable through said wedge shaped member and generally conforming to the configuration of said wedge member and said slot but releasable therefrom when said wedge member is withdrawn from said slot, and eccentric means associated with said wedge member to cause the clamping and release of said cutting tool relative to said wedge member and said slot.

2. In a device of the class described including a head having a tapered slot extending therethrough, a wedge member slidable in said slot, a cutting tool positioned within said wedge member and capable of being gripped and released by said wedge member, eccentric means positioned in said head and contacting said wedge member, whereby said wedge member may be moved relative to said slot and said cutting tool, said eccentric means engaging in a slot formed in said wedge member.

3. In a device of the class described as claimed in claim 1 and including spring urged means carried by said wedge member for retracting the same when released by said eccentric means.

4. In a tool holder of the class described, comprising a shank and a slotted head, said slot and said head section being tapered, a slidable wedge member capable of moving in said slot, a cutting tool slidable within said wedge member, and spring means for holding the wedge member away from the wall of the slot.

5. In a tool holder of the class described, comprising a shank, a head having a tapering slot extending therethrough, a wedge member L-shaped in cross section extending through said slot, a cam for operating said slidable wedge member, a spring pressed member for holding the wedge member away from one wall of the slot, a cutting tool slidable in said L-shaped wedge member, whereby the tool may be tightly clamped in the opening and the clamping member.

6. A tool holder of the class described, comprising a shank, a head carried thereby having a tapering slot extending therethrough, a wedge member L-shaped in cross section extending through said slot and having a transverse slot intermediate its ends, a shaft extending transversely of the head and having a cam in the transverse slot in the wedge member, a cutting tool rectangular in cross section and slidable within said L-shaped wedge member, and a spring pressed member for holding the wedge shaped member from one wall of the slot.

7. A tool holder of the class described, comprising a shank carrying a slotted head, said slot being tapered, a slidable wedge member L-shaped in cross section and slidable in said slot, a transverse slot in the face of the wedge member, a cam mounted in the head and the slot, a tool rectangular in cross section carried by the L-shaped wedge member, and a spring pressed detent carried by the wedge member on the opposite face from the cam slot, whereby the wedge member is held away from the wall of the tapered slot.

SIEGFRIED SPECKERT.